US011931732B2

(12) United States Patent
Hao et al.

(10) Patent No.: US 11,931,732 B2
(45) Date of Patent: Mar. 19, 2024

(54) GAS INLET STRUCTURE FOR REAGENT KIT

(71) Applicant: Shijiazhuang Hipro Biotechnology Co., Ltd., Shijiazhuang (CN)

(72) Inventors: Shushun Hao, Shijiazhuang (CN); Yanjun Sui, Shijiazhuang (CN); Lizhu Chen, Shijiazhuang (CN); Shiyuan Xing, Shijiazhuang (CN); Zhaohui Yao, Shijiazhuang (CN)

(73) Assignee: Shijiazhuang Hipro Biotechnology Co., Ltd., Shijiazhuang (CN)

( * ) Notice: Subject to any disclaimer, the term of this patent is extended or adjusted under 35 U.S.C. 154(b) by 0 days.

(21) Appl. No.: 18/199,906

(22) Filed: May 19, 2023

(65) Prior Publication Data

US 2023/0285958 A1 Sep. 14, 2023

Related U.S. Application Data

(63) Continuation of application No. PCT/CN2021/117658, filed on Sep. 10, 2021.

(30) Foreign Application Priority Data

Nov. 23, 2020 (CN) ......................... 202011317116.X

(51) Int. Cl.
*B01L 3/12* (2006.01)
*B01L 3/00* (2006.01)

(52) U.S. Cl.
CPC .................. *B01L 3/12* (2013.01); *B01L 3/52* (2013.01); *B01L 2300/048* (2013.01)

(58) Field of Classification Search
None
See application file for complete search history.

(56) References Cited

U.S. PATENT DOCUMENTS

2005/0000973 A1 1/2005 Sbongk
2017/0225809 A1 8/2017 Kamhi et al.

FOREIGN PATENT DOCUMENTS

CN 111308110 A 6/2020
DE 3701250 A1 * 7/1988 ................ B01L 3/02
EP 1566145 A1 8/2005
EP 3370040 A1 * 9/2018 ................ A61J 1/18

OTHER PUBLICATIONS

International Search Report and Written Opinion received in Patent Cooperation Treaty Application No. PCT/CN2021/117658, dated Oct. 29, 2021.

* cited by examiner

*Primary Examiner* — P. Kathryn Wright
(74) *Attorney, Agent, or Firm* — AP3 Law Firm, PLLC

(57) ABSTRACT

The present application provides a gas inlet structure for a reagent kit, which includes a gas inlet connecting pipe and a plugging pipe arranged at one end of the gas inlet connecting pipe. The plugging pipe is provided with a gas nozzle plug, and the plugging pipe is in interference fit with the gas nozzle plug. The gas nozzle plug is provided with a gas inlet blind hole that is arranged along an axis direction of the gas nozzle plug, and an opening end of the gas inlet blind hole faces the gas inlet connecting pipe.

3 Claims, 2 Drawing Sheets

GAS INLET STRUCTURE FOR REAGENT KIT

CROSS-REFERENCE TO RELATED APPLICATIONS

This application is a continuation of International Application No. PCT/CN2021/117658, filed on Sep. 10, 2021, which claims priority to Chinese Patent Application No. 202011317116.X, filed on Nov. 23, 2020. The disclosures of the aforementioned applications are hereby incorporated by reference in their entireties.

TECHNICAL FIELD

The present application relates to the technical field of reagent kit, and particularly relates to a gas inlet structure for a reagent kit.

BACKGROUND

In the gas inlet structures of the reagent kit, the existing gas connection joints are mostly inverted cone joints and quick insertion joints. When using inverted cone joints, the installation of the gas pipe is difficult and not conducive to fast installation. The quick insertion joints can achieve fast installation of the gas pipe, but the quick insertion joints themself require sufficient installation space, which is not easy to install in a narrow space. Neither of the above two types of joints can meet the requirements of convenient use.

SUMMARY

These and other problems are generally solved or circumvented, and technical advantages are generally achieved, by embodiments of the present application which provide a gas inlet structure for a reagent kit.

Technical Problems

The present application provides a simple and convenient gas inlet structure for a reagent kit to solve the problem that the existing gas joints cannot meet the requirements of convenient use.

Technical Solutions

The present application adopts the following technical solutions: the present application provides a gas inlet structure for a reagent kit, which includes a gas inlet connecting pipe and a plugging pipe arranged at one end of the gas inlet connecting pipe; and where the plugging pipe is provided with a gas nozzle plug, and the plugging pipe is in interference fit with the gas nozzle plug; and the gas nozzle plug is provided with a gas inlet blind hole that is arranged along an axis direction of the gas nozzle plug, and an opening end of the gas inlet blind hole faces the gas inlet connecting pipe.

In one of the embodiments, the gas inlet connecting pipe and the plugging pipe are both annular pipes, and the gas nozzle plug is a cylindrical body.

In one of the embodiments, an outer side wall of the gas nozzle plug is provided with a sealing boss along a circumference direction of the outer side wall.

In one of the embodiments, a number of the sealing boss is two.

In one of the embodiments, the gas inlet blind hole includes a frustum-shaped gas inlet hole and a cylindrical gas inlet hole that are interconnected with each other; the cylindrical gas inlet hole provides a blind end; a first bottom end of the frustum-shaped gas inlet hole is connected with the cylindrical gas inlet hole, and a second bottom end of the frustum-shaped gas inlet hole is the opening end of the gas inlet blind hole, a diameter of the second bottom end being greater than a diameter of the first bottom end.

In one of the embodiments, the diameter of the first bottom end of the frustum gas inlet hole is equal to a diameter of the cylinder gas inlet hole.

In one of the embodiments, a material of the gas nozzle plug is an elastic sealing material.

Advantageous Effects of the Disclosure

The beneficial effect of the present application lies in the good sealing effect of the gas inlet structure for the reagent kit provided in the present application, and the use of the gas inlet blind hole design makes it easier during gas needle puncture and more convenient.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

Figure 1:
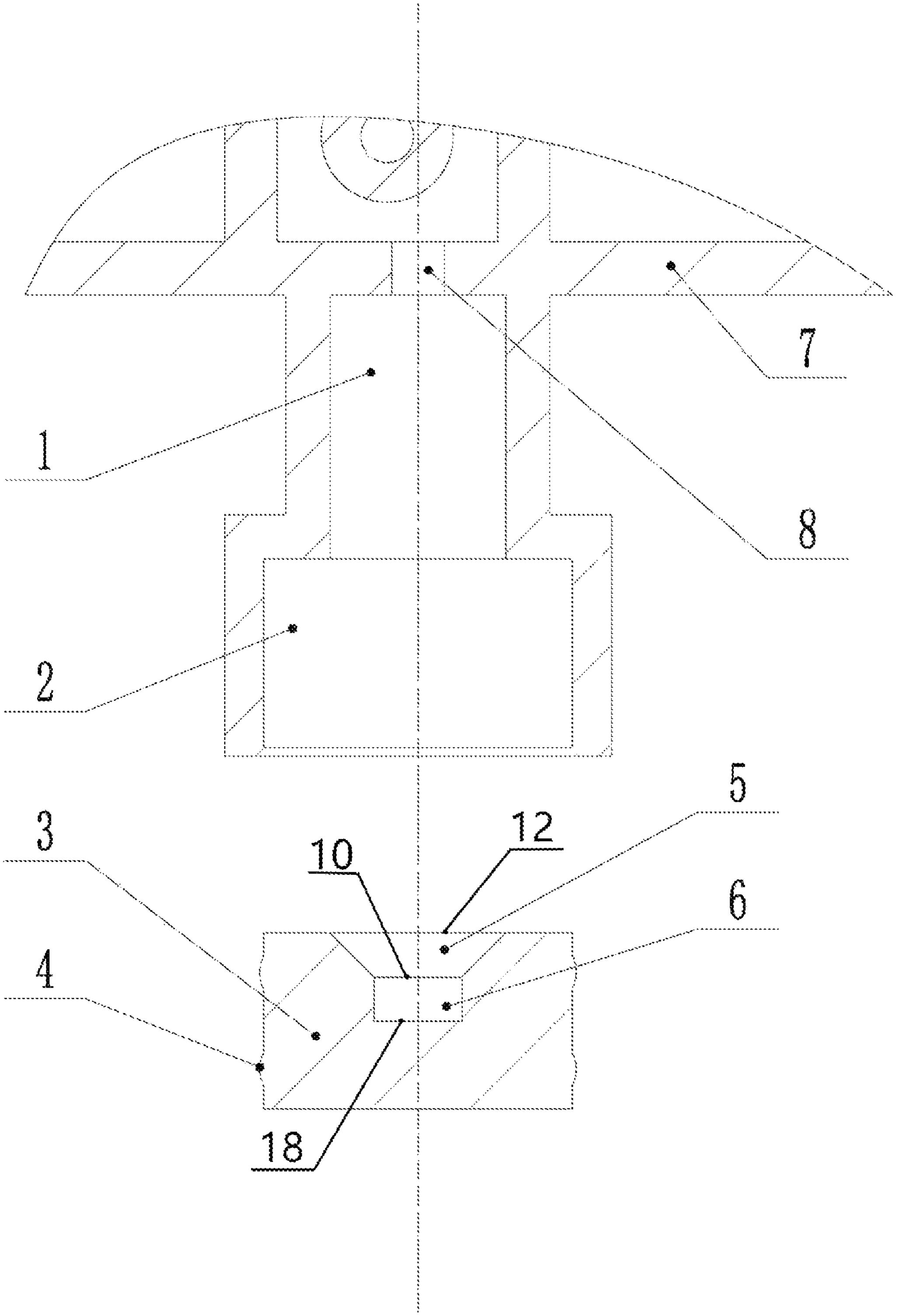
FIG. 1 is a structure schematic diagram of a gas inlet structure for a reagent kit provided by one embodiment of the present application.

In the following description, a clear and complete description of the technical solution in the embodiments of the present application will be provided referring to the drawings. It should be appreciated, however, that the concepts disclosed herein can be embodied in a wide variety of specific contexts. The specific embodiments discussed are merely illustrative, and do not limit the scope of the claims.

Figure 2:
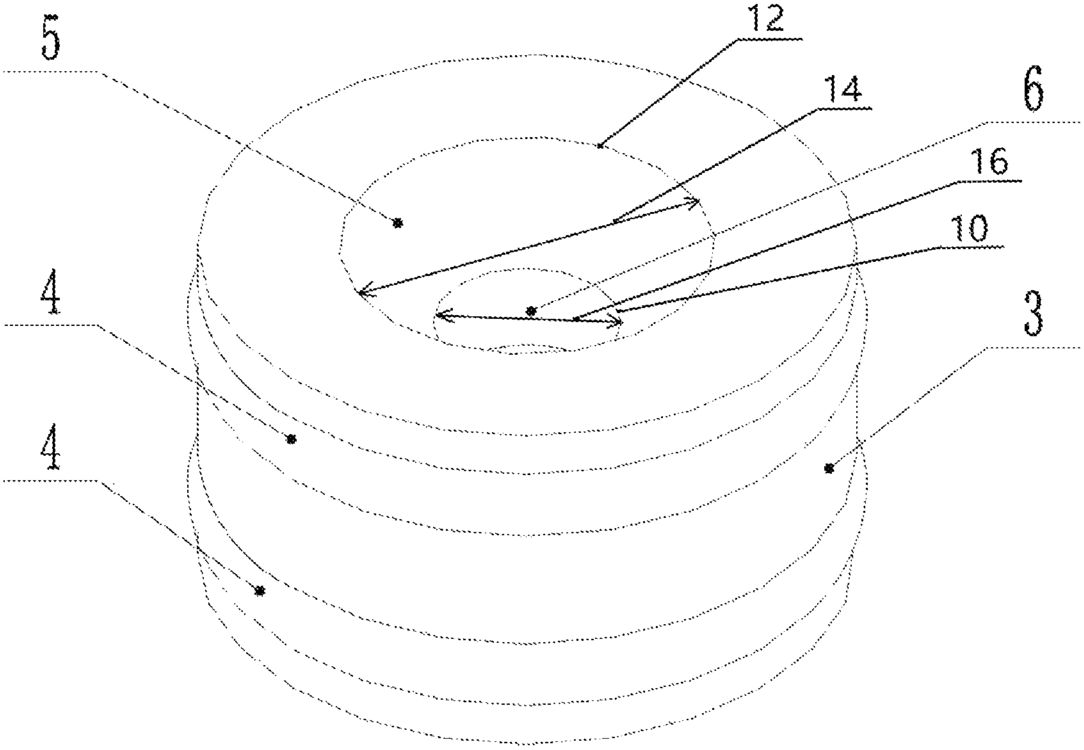
FIG. 2 is a structure schematic diagram of a gas plug of a gas inlet structure for a reagent kit provided by one embodiment of the present application.
Figure 3:
FIG. 3 is a side structure schematic diagram of a gas plug of a gas inlet structure for a reagent kit provided by one embodiment of the present application.

As shown in FIGS. 1 to 3, embodiments of the present application provide a gas inlet structure for a regent kit, which includes a gas inlet connecting pipe 1 and a plugging pipe 2 arranged at one end of the gas inlet connecting pipe 1; and where the plugging pipe 2 is provided with a gas nozzle plug 3, and the plugging pipe 2 is in interference fit with the gas nozzle plug 3; and the gas nozzle plug 3 is provided in the middle with a gas inlet blind hole (i.e., a frustum-shaped gas inlet hole 5 and a cylindrical gas inlet hole 6 as described later) that is arranged along an axis direction of the gas nozzle plug 3, and an opening end 12 of the gas inlet blind hole faces the gas inlet connecting pipe 1. Among them, the axis of the gas nozzle plug 3 coincides with the axis of the plugging pipe 2 and the axis of the gas inlet connecting pipe 1, which is coaxial. The gas inlet structure for the reagent kit may be used for air or other gases to enter or pass through.

The gas inlet connecting pipe 1 and the plugging pipe 2 are both annular pipes, and the gas nozzle plug 3 is a cylindrical body. An outer side wall of the gas nozzle plug 3 is provided with a sealing boss 4 along a circumference direction of the outer side wall. A number of the sealing boss 4 may be two. Of course, the number of sealing bosses 4 may also be other quantities, such as one, three, four or more.

The gas inlet connecting pipe 1 is connected with the gas inlet opening 8 of the reagent kit 7, and the gas nozzle plug 3 plugs the plugging pipe 2, plugging the connection between the gas inlet connecting pipe 1 and the outside. When in use, the gas needle is pierced through the gas nozzle plug 3 to connect the gas needle with the gas inlet connecting pipe 1, achieving the gas inlet operation of the reagent kit 7. The sealing boss 4 compresses the inner side wall of the plugging pipe 2 outward to achieve the sealing effect of the plugging pipe 2 relative to the outside. Among them, the gas needle is usually connected to the gas supply equipment, and the gas needle is used to input gas into the gas inlet connecting pipe 1.

The gas inlet blind hole is formed by the frustum-shaped gas inlet hole 5 and the cylindrical gas inlet hole 6 that are interconnected with each other along the axis direction of the gas nozzle plug 3. As shown in FIG. 2, the cylindrical gas inlet hole 6 is below the frustum-shaped gas inlet hole 5. The frustum-shaped gas inlet hole 5 is closer to the gas inlet connecting pipe 1 than the cylindrical gas inlet hole 6. The cylindrical gas inlet hole 6 is a blind hole without running through the gas nozzle plug 3, and has a blind end (or closed end) 18, which ends within the gas nozzle plug 3; a first bottom end 10 of the frustum-shaped gas inlet hole 5 is connected with the cylindrical gas inlet hole 6, and a second bottom end 12 of the frustum-shaped gas inlet hole 5 is the opening end 12 of the gas inlet blind hole facing the gas inlet connecting pipe 1, where a diameter 14 of the second bottom end 12 is greater than a diameter 16 of the first bottom end 10. The diameter 16 of the first bottom end 10 of the frustum-shaped gas inlet hole 5 is equal to a diameter of the cylindrical gas inlet hole 6. The frustum-shaped gas inlet hole 5 means that the hole has a first bottom end 10 and a second bottom end 12, the aperture of the second bottom end 12 is larger than the aperture of the first bottom end 10, and the aperture between the second bottom end 12 and the first bottom end 10 is gradually decreasing.

When the gas needle is punctured, the tip of the gas needle is pierced into the middle of the gas nozzle plug 3 from the end face of the reagent kit 7. After passing through the blind end of the cylindrical gas inlet hole 6, the gas needle enters the gas inlet connecting pipe 1 through the cylindrical gas inlet hole 6 and the frustum-shaped gas inlet hole 5, completing the connection between the gas needle and the gas inlet opening 8 of the reagent kit 7, thereby achieving the gas inlet operation of the reagent kit 7. The gas inlet blind hole causes the thickness of the middle part of the gas nozzle plug 3 to become thinner in the axial direction, making it easy for the needle of the gas needle to penetrate. The cylindrical gas inlet hole 6 facilitates the positioning of the gas needle during puncture, while the frustum-shaped gas inlet hole 5 has a larger opening, which can avoid the left and right shaking of the gas needle during the puncture process, thereby avoiding the insertion of the gas needle into the side wall of the gas inlet blind hole to prevent blockage of the gas needle. It should be noted that the outer circle of the gas nozzle plug 3 cannot become thinner, otherwise it will reduce the sealing performance of gas nozzle plug 3.

The above-mentioned embodiments are only preferred embodiments of the present application, but do not to limit the present application. However, any modification, equivalent replacement, improvement made within the spirit and principle of the present application should be included within the protection scope of the present application.

Moreover, the scope of the present disclosure is not intended to be limited to the particular embodiments described here. As one of ordinary skill in the art will readily appreciate from the disclosure of the present disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A gas inlet structure for a reagent kit, comprising:

a gas inlet connecting pipe; and a plugging pipe arranged at one end of the gas inlet connecting pipe; and wherein the plugging pipe is provided with a gas nozzle plug, and the plugging pipe is in interference fit with the gas nozzle plug; and the gas nozzle plug is provided with a gas inlet blind hole that is arranged along an axis direction of the gas nozzle plug, and an opening end of the gas inlet blind hole faces the gas inlet connecting pipe;

wherein the gas inlet connecting pipe and the plugging pipe are both annular pipes, and the gas nozzle plug is a cylindrical body;

wherein an outer side wall of the gas nozzle plug is provided with a sealing boss along a circumference direction of the outer side wall; wherein a number of the sealing boss is two; and wherein the gas inlet blind hole comprises a frustum-shaped gas inlet hole and a cylindrical gas inlet hole that are interconnected with each other along the axis direction of the gas nozzle plug, and the frustum-shaped gas inlet hole is closer to the gas inlet connecting pipe than the cylindrical gas inlet hole, such that a gas needle, when being inserted in the gas inlet structure, passes through the cylindrical gas inlet hole, the frustum-shaped gas inlet hole and the gas inlet connecting pipe in sequence; the gas inlet blind hole ends within the gas nozzle plug with a closed end;

a first bottom end of the frustum-shaped gas inlet hole is connected with the cylindrical gas inlet hole, and a second bottom end of the frustum-shaped gas inlet hole is the opening end of the gas inlet blind hole, a diameter of the second bottom end being greater than a diameter of the first bottom end, and the diameter of the second bottom end being greater than a diameter of the cylindrical gas inlet hole.

2. The structure according to claim 1, wherein the diameter of the first bottom end of the frustum-shaped gas inlet hole is equal to the diameter of the cylindrical gas inlet hole.

3. The structure according to claim 1, wherein a material of the gas nozzle plug is an elastic sealing material.

* * * * *